US012593089B2

(12) United States Patent
Kolesa

(10) Patent No.: US 12,593,089 B2
(45) Date of Patent: Mar. 31, 2026

(54) HLS GLOBAL SYNCHRONIZATION AND MULTI-VIEWER WATCH PARTIES

(71) Applicant: Napster Corporation, Boca Raton, FL (US)

(72) Inventor: Paul Kolesa, Hermosa Beach, CA (US)

(73) Assignee: NAPSTER CORPORATION, Boca Raton, FL (US)

( * ) Notice: Subject to any disclaimer, the term of this patent is extended or adjusted under 35 U.S.C. 154(b) by 0 days.

(21) Appl. No.: 18/777,637

(22) Filed: Jul. 19, 2024

(65) Prior Publication Data

US 2025/0030903 A1      Jan. 23, 2025

Related U.S. Application Data

(60) Provisional application No. 63/514,590, filed on Jul. 20, 2023.

(51) Int. Cl.
H04N 21/242        (2011.01)
H04N 21/8547      (2011.01)

(52) U.S. Cl.
CPC ....... H04N 21/242 (2013.01); H04N 21/8547 (2013.01)

(58) Field of Classification Search
None
See application file for complete search history.

(56) References Cited

U.S. PATENT DOCUMENTS

| | | |
|---|---|---|
| 10,397,289 B2 | 8/2019 | Jennings et al. |
| 2017/0142489 A1 | 5/2017 | DeWeese et al. |
| 2020/0162784 A1 | 5/2020 | Madison et al. |
| 2020/0162796 A1* | 5/2020 | Azuolas ............. H04N 21/4788 |

OTHER PUBLICATIONS

Arntzen et al., "Media Synchronization on the Web", Springer, Mar. 27, 2018, 32 pages.
International Search Report for PCT Application No. PCT/US24/38632 dated Nov. 14, 2024.

* cited by examiner

*Primary Examiner* — James R Marandi
(74) *Attorney, Agent, or Firm* — BROOKS KUSHMAN P.C.

(57)        ABSTRACT

Synchronizing is performed of multiple live Hypertext Transfer Protocol (HTTP) Live Streaming (HLS) streams in hypertext markup language (HTML) MediaElements. Time differentials are computed between video encoder date/time tags and current date/time retrieved from a universal time (UTC) time server. A playhead position of an HTML Media-Element is controlled to maintain a calculated time offset value defined as the current date/time minus a predefined time offset. MediaElement source content and the playhead position are dynamically controlled while maintaining video synchronization to the predefined time offset.

35 Claims, 11 Drawing Sheets

Manifest Example with EXT-X-PROGRAM-DATE-TIME

```
#EXTM3U
#EXT-X-VERSION:3
#EXT-X-START:TIME-OFFSET=0
#EXT-X-TARGETDURATION:10
#EXT-X-PLAYLIST-TYPE:VOD
#EXT-X-PROGRAM-DATE-TIME:2022-12-02T18:33:00.007Z
#EXTINF:6.000,
2022-12-02/18/segment_1.ts
#EXT-X-PROGRAM-DATE-TIME:2022-12-02TI8:33:06.007Z
#EXTINF:6.000,
2022-12-02/18/segment_2.ts
```

Param and value: vod=230413120000-033545

WARNING: Playback Start Date/Time must be 24 hour format and UTC +0. Do not set time values by local timezone, unexpected results will occur.

Parameter Fields

| Param | Start Date/Time | Delimeter | Video Duration |
|-------|-----------------|-----------|----------------|
| vod=  | 230413120000    | -         | 33545          |

Value Sub-Fields

| Param | Year | Month | Day | Hour | Minutes | Seconds | Delimeter | Hour | Minutes | Seconds |
|-------|------|-------|-----|------|---------|---------|-----------|------|---------|---------|
| vod=  | 23   | 04    | 13  | 12   | 00      | 00      | -         | 03   | 35      | 45      |

Example:

| https://theinfinitereality.io/hls/index.m3u8?jwt=XXXXXXX&vod=230413120000-0335A5 |
|---|

*FIG. 8*

HLS GLOBAL SYNCHRONIZATION AND MULTI-VIEWER WATCH PARTIES

CROSS-REFERENCE TO RELATED APPLICATIONS

This application claims the benefit of U.S. provisional application Ser. No. 63/514,590 filed Jul. 20, 2023, the disclosure of which is hereby incorporated in its entirety by reference herein.

TECHNICAL FIELD

The present disclosure relates to synchronized live streamed digital video delivery, which may be used with the Hypertext Transfer Protocol (HTTP) Live Streaming (HLS) protocol, as well as multi-user social watch party content viewing.

BACKGROUND

A method of HLS synchronization, such as defined in U.S. Pat. No. 10,397,289 B2, requires specialized infrastructure to start client playback at the same segment. Several open-source HLS players can be configured to start playback "X" seconds or number of segments from the live edge. The latter method does not account for different clients retrieving the manifest at different times, resulting in different segments constituting the live edge. Neither method accounts for network condition related errors after playback has started, which can result in local desync of one or more streams, nor do they provide any "quality of life" functionality for the viewer to effectively watch multiple streams.

SUMMARY

In one or more illustrative examples, a method for synchronizing multiple live Hypertext Transfer Protocol (HTTP) Live Streaming (HLS) streams in hypertext markup language (HTML) MediaElements includes calculating time differentials between video encoder date/time tags and current date/time retrieved from a universal time (UTC) time server; controlling a playhead position of an HTML MediaElement to maintain a calculated time offset value defined as the current date/time minus a predefined time offset; and dynamically controlling MediaElement source content and the playhead position while maintaining video synchronization to the predefined time offset.

In one or more illustrative examples, the multiple live HLS streams are segmented and UTC date/time stamps of segments are written to a manifest or playlist of the multiple live HLS streams.

In one or more illustrative examples, one or more of: the method is performed using an application programming interface (API) of HTML MediaElements, or the method is performed using API of HLS video players.

In one or more illustrative examples, the method further includes using a seek function to adjust the playhead position to a specified position.

In one or more illustrative examples, the method further includes modulating playhead speed up to adjust the playhead position to the specified position.

In one or more illustrative examples, the method further includes modulating play speed down to adjust the playhead position to the specified position.

In one or more illustrative examples, the method further includes checking an actual time offset on an interval and performs actions to adjust the playhead position responsive to the actual time offset indicating that a specified drift is exceeded.

In one or more illustrative examples, the HTML MediaElements are destroyed and recreated in a manner that UTC synchronization is restored with the new HTML MediaElement.

In one or more illustrative examples, time values calculated prior to destruction of one of the HTML MediaElements are reindexed to restore state of the HTML MediaElement upon recreation of the HTML MediaElement.

In one or more illustrative examples, a time delta value is calculated between a prior UTC date/time tag value and a new UTC date/time tag value retrieved upon element recreation.

In one or more illustrative examples, the time delta value is used to calculate and seek the playhead position of the source content.

In one or more illustrative examples, the method further includes synchronizing a plurality of HLS streams received to a client device.

In one or more illustrative examples, the method further includes synchronizing a plurality of HLS streams across a plurality of client devices, enabling global synchronization of video playback for watch parties composed of a plurality of viewers.

In one or more illustrative examples, the viewers are geographically diverse in location.

In one or more illustrative examples, the viewers are communicating over voice chat mechanisms.

In one or more illustrative examples, the viewers are communicating over video chat mechanisms.

In one or more illustrative examples, the viewers are communicating over text chat mechanisms.

In one or more illustrative examples, a system for synchronizing multiple live HLS streams in HTML MediaElements, the multiple live HLS streams being segmented stamped with UTC date/time stamps in a manifest includes a client hardware device executing a web browser application to perform operations including to: calculate time differentials between the UTC date/time stamps and current date/time retrieved from a UTC time server; control a playhead position of an HTML MediaElement to maintain a calculated time offset value defined as the current date/time minus a predefined time offset; and dynamically control MediaElement source content and the playhead position while maintaining video synchronization across the multiple live HLS streams to the predefined time offset.

In one or more illustrative examples, a non-transitory computer-readable media includes instruction for synchronizing multiple live HLS streams in HTML MediaElements, the multiple live HLS streams being segmented stamped with UTC date/time stamps in a manifest that, when executed by a client hardware device executing a web browser application cause the client hardware device to perform operations including to: calculate time differentials between the UTC date/time stamps and current date/time retrieved from a UTC time server; control a playhead position of an HTML MediaElement to maintain a calculated time offset value defined as the current date/time minus a predefined time offset; and dynamically control MediaElement source content and the playhead position while maintaining video synchronization across the multiple live HLS streams to the predefined time offset.

BRIEF DESCRIPTION OF THE DRAWINGS

FIG. 2 shows an example HLS manifest;

FIG. 8 shows an example video on demand (VOD) query string of a universal resource location (URL);

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
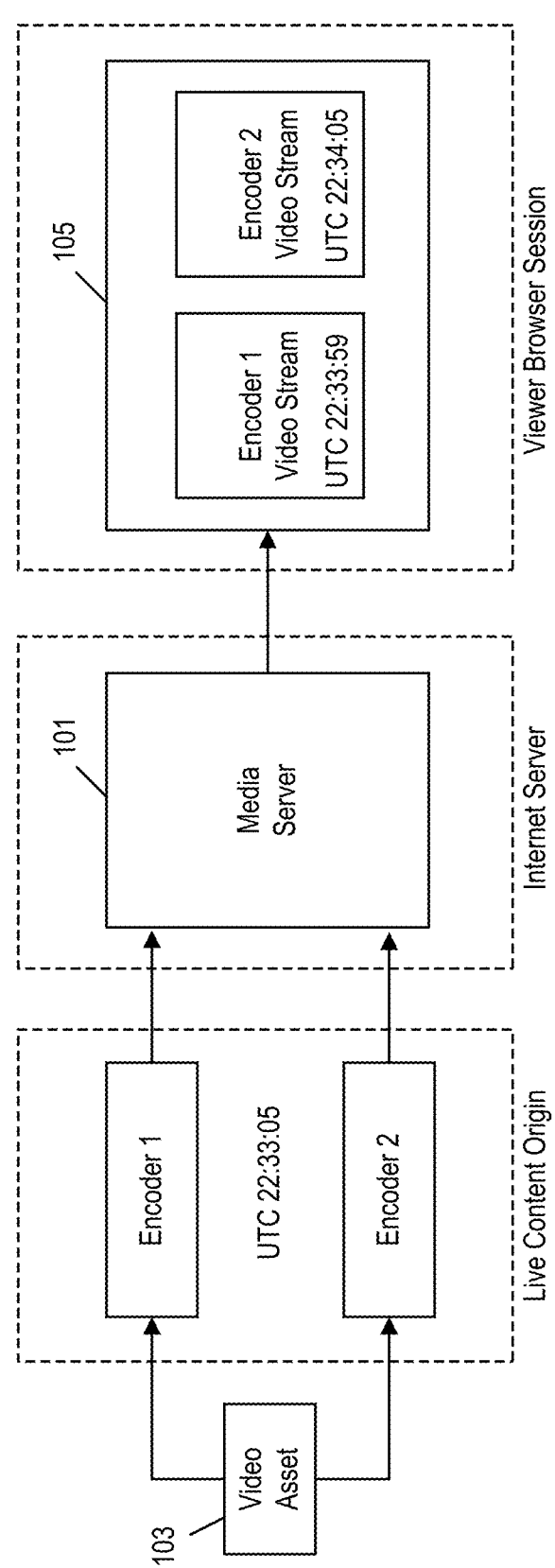
FIG. 1 shows a block diagram of a system for streamed digital video delivery.

FIG. 1 shows a block diagram of a system for streamed digital video delivery. As shown, the system includes a content delivery network (CDN) 101, a plurality of streams 103, and a user session 105 executed by a client, such as a browser of a user device. In the illustration, two example streams 103 are provided from a content origin, through the CDN 101, and to the user session 105. The streams 103 may be, for example, of the same event but from different camera angles.

At a high level, HLS works by encoding video streams 103 into segments. These segments are uploaded as they become available to an origin server. The video is typically distributed to clients through the CDN 101. The segments are usually aligned with group of pictures (GOPs), starting with "I" frames, which provides resilience in the event of network errors, and are appended to a live manifest (e.g., m3u8 live format). In many cases, even when viewing multiple streams 103 of different camera angles of the same live event from a single user session 105, the streams 103 can be out of sync by one or more GOPs, which are typically 2-6 seconds in length. This problem is compounded as the video segments and live manifest propagate across the CDN 101, increasing the desync time between viewers.

A method is provided for synchronization of multiple HLS live streams 103 or a set of VOD streams 103 created from prior HLS live streams 103. HLS, by design, lacks features allowing multiple audio/video (AV) streams 103 produced by separate encoders to be viewed simultaneously and in sync with one another.

The present disclosure allows the client to play back multiple HLS streams 103 simultaneously, synchronized to a universal time (UTC) offset value or to a set of VOD streams 103 produced from a prior event synchronized by a time parameter. As a result, all viewers, regardless of geographical location, will be able to watch multiple "camera angles" of a live event encoded to HLS, not only in time synchronization within their browser session, but also in synchronization with other viewers. This mechanism enables remote "watch parties", where geographically diverse viewers can interact socially with one another through voice/video/text chat while watching content, at the same point in the broadcast, as if they were in the same physical location.

FIG. 2 shows an example HLS manifest. The present disclosure improves on existing web-based HLS players with the addition of a JavaScript synchronization module which provides the functionality needed to synchronize live and VOD HLS. The Live HLS functions allow multiple live videos to synchronize to "X" seconds of offset from UTC current time by reading #EXT-X-PROGRAM-DATE-TIME tags 201 written by the encoder to the HLS manifest and running time delta algorithm software module to move the playhead to the proper time offset. (For high accuracy the encoder should be configured to add this tag to each segment of the manifest.) The VOD HLS functions parse a timing parameter, retrieved through a URL query string or an inter-client network transaction, that provides the data necessary to calculate the playhead position. The Live HLS implementation utilizes the timestamps provided by the encoder as the timing truth source, and the VOD HLS implementation queries a public network time protocol (NTP) time server, with a failover to system time, during video load as a timing truth source. The same method of time synchronization can be utilized with embedded society of cable and telecommunications engineers (SCTE)-35 timecode which allows for the same method to be used with any container capable of carrying transport stream 103 packets. The module runs in the client browser session and requires no additional infrastructure.

The Live HLS algorithm creates a time delta value from system UTC current and the program date/time tag retrieved from the HLS manifest which it uses to bring the playhead of each video within 1 second accuracy (+/−0.5 seconds) of the offset time. The time diff array is a set of time offsets, one for each live stream 103, calculated by the sync module, that seek forward/reverse to achieve +/−1 s of UTC time retrieved from NTP server.

The VOD HLS algorithm has two timing modes, a static time offset providing a similar experience to Live or inter-client where the timing is generated by the initiating user playhead time. The VOD static time offset method parses a URL query string which provides a year/month/day/hour/minute/second start time as well as the duration of the VOD in hours/minutes/seconds and calculated playhead position as if the VOD was looping live from the start time on. The VOD inter-client method passes the playback start time and current playhead time of the initiating user through a p2p connection to the "watch party guest" users.

Figure 3:
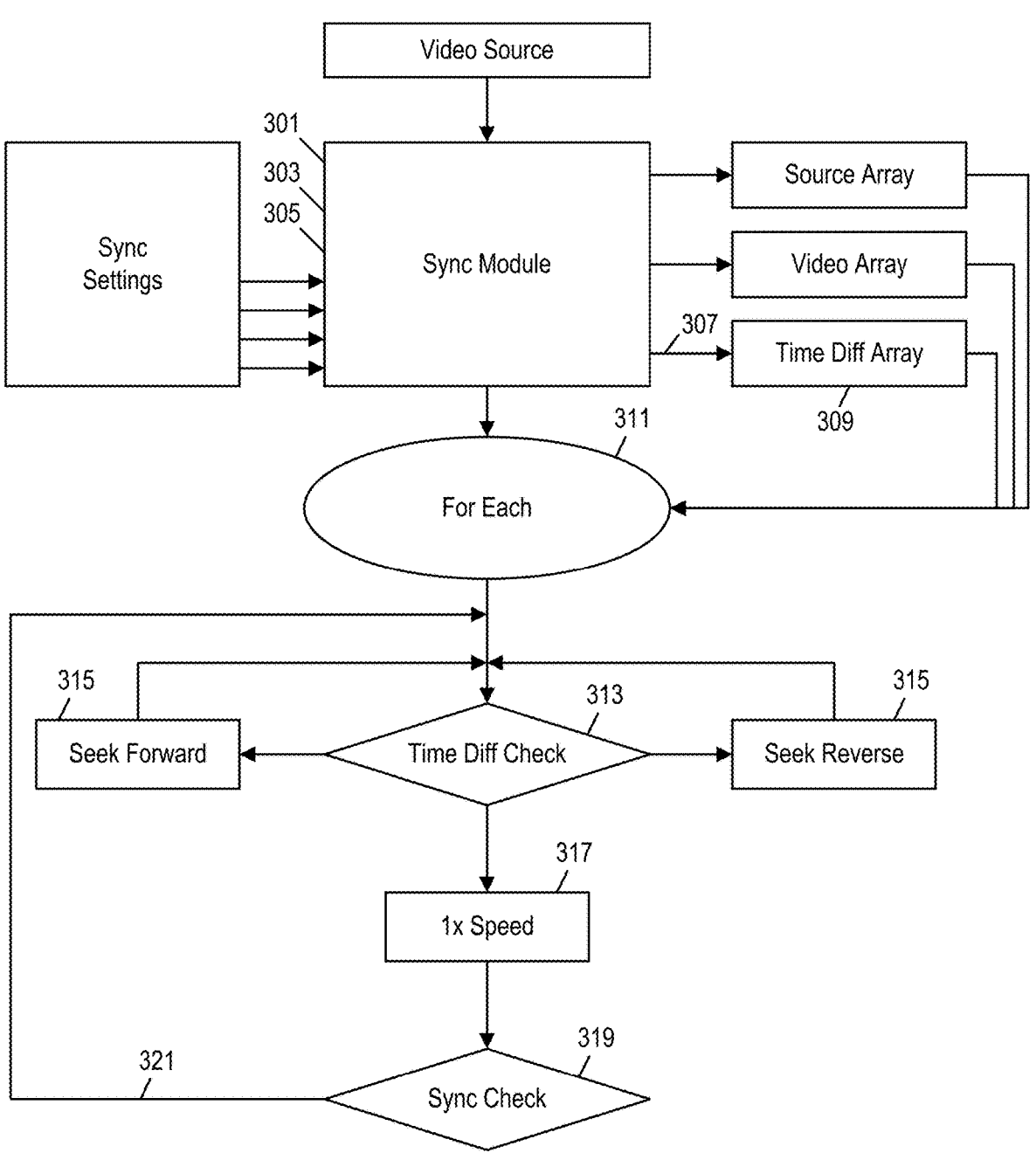
FIG. 3 shows an example process for streamed digital video delivery.

FIG. 3 illustrates an example data flow for the operation of the Live HLS synchronization algorithm module. As shown, a video source, such as the HLS streams 103 of the CDN 101, provides HLS streams 103 to a synchronization module.

The Live HLS synchronization algorithm module is initialized in the web player by three function calls. The first call initializes a source array 301, which contains the HLS URLs for playback. The second call initializes the HLS player 303 and uses the array to retrieve HLS manifests and starts downloading segments, where the HLS player 303 includes logic providing compatibility to both Chromium and Webkit browsers. The third call starts synchronization

305, calling the corresponding functions required for either Chromium or Webkit. The sync function gets UTC now from an NTP server, and also the ext date/time tag value of the first segment, and using these two values calculates the time delta between them. This delta value is used in forward/reverser (F/R) seek to perform the initial sync. The three functions of the initialization of the source array 301, the initialization of the HLS player 303, and the initialization of the synchronization 305 can be wrapped into a single Javascript function or called individually depending on the requirements of the front-end software stack. The functions 301, 303, 305 are designed in such a way that one or many video elements can be initialized at once.

For each video element, the element object, index, and tolerance value is passed to the synchronization 305 function. The #EXT-X-PROGRAM-DATE-TIME tag 201 of each element is saved to an array, current playhead time is stored to an array, and the two are added together to produce a new datetime object representing playhead current UTC time which is stored to a new date array. A new UTC datetime object is created representing current UTC time, a time differential is calculated by subtracting the new date array index value from a current UTC time object 307, and the resulting time differential is stored to an array 309. Several validation checks 311 are performed to assure the values returned in prior steps are the correct type to pass as inputs to the algorithm, if passed the main logic of the synchronization function begins at 313. The time difference array 309 value of the corresponding video element is checked to determine whether it is less or greater than delay minus half the tolerance value or if it is greater or less than delay plus half the tolerance value shown at 315. Pending the outcome of the checks 311, one of four actions will occur to meet the configured live edge offset value. These four actions include to (i) seek the video to a calculated playhead position, (ii) the play speed will be increased to catch up to the offset, (iii) the play speed will be decreased to meet the offset, or (iv) the play speed will be set to normal when the offset has been met.

Once a video element has met the offset, within 1 second (+/−0.5 seconds) of offset target 317, a drift value is applied to its tolerance and the sync function sleeps, checking on an interval to determine if the drift tolerance has been exceeded 319. The drift value prevents the logic from running unnecessarily, such as the video settling near the edge of the initial sync value. In the event drift exceeds the specified limit, the main logic of the synchronization function executes at 321 and brings the playhead position back to the specified offset. Network errors, bandwidth choke, recoverable video errors, or any event that moves the play out of its specified drift range will invoke a resynchronization.

The VOD HLS synchronization routine is initialized when a "VOD" or "EVENT" manifest type is detected. It provides a similar end user viewing experience to that of a pre-programed scheduled program. First, the live sync functions are disabled to prevent unintended speed modulation. The URL is then parsed for the presence of a "vod" query string, as shown in FIG. 8, delimited from the URL by a "?", if it is the first or only URL parameter, or a "&" if it is a subsequent parameter. The "vod" parameter provides timing information to the VOD sync function in two parts, start date/time and VOD duration. The start date/time string provides year, month, day, hour, minute, and second that the VOD program content is to begin its playback loop. The second field, delimited by "-" provides duration of the VOD in hours, minutes, seconds. Each value of the two fields is represented by two numerical characters, in an example.

Figure 9:
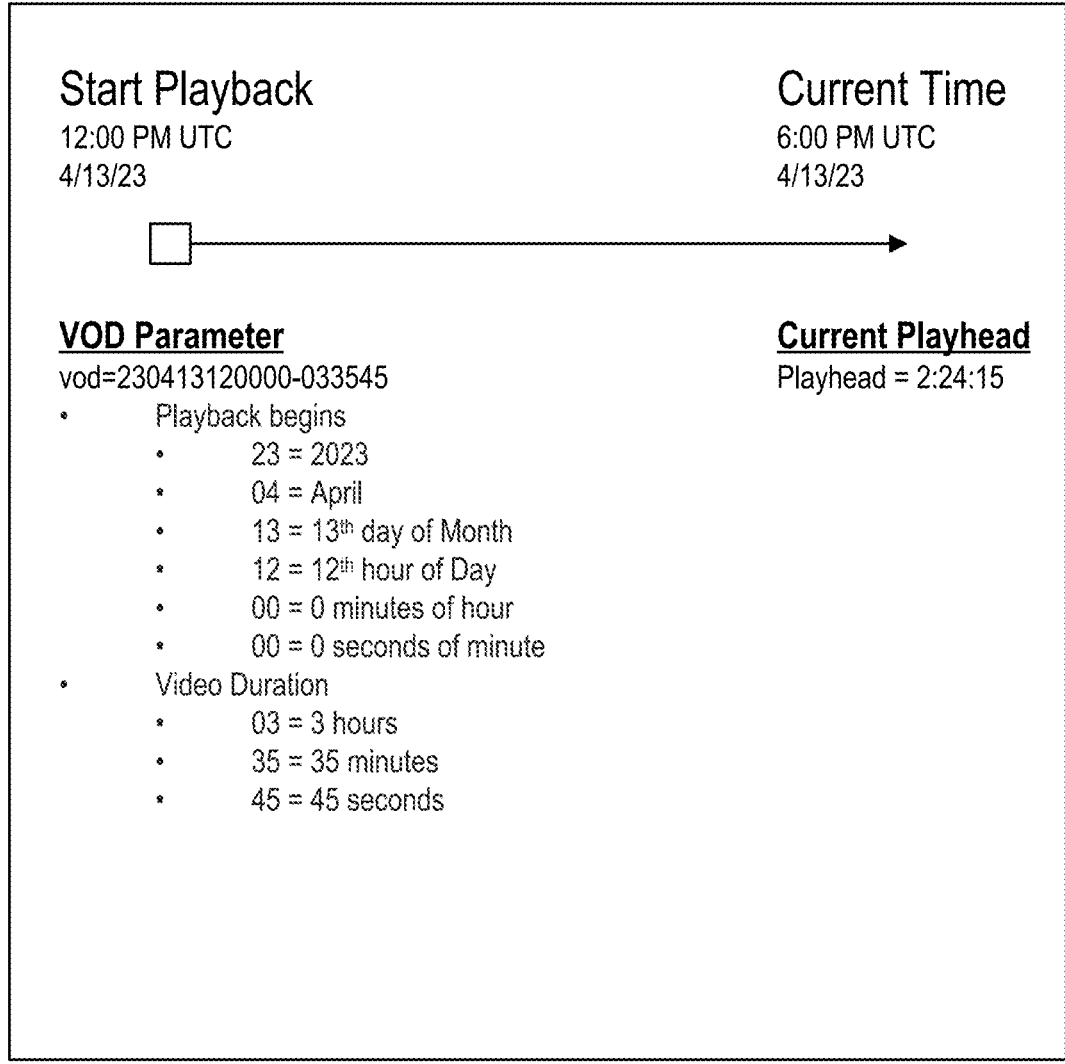
FIG. 9 shows an example of VOD parameters in comparison to a current playback position.

Once parsed, the VOD sync function calculates the current playhead position relative to the start time provided in the first parameter field and considering the content duration of the second field. This is shown in FIG. 9. The result is a looped playback sequence that appears to the end user as a live content loop. The advantage of VOD time offset, as opposed to a live loop channel type, is a significant reduction in infrastructure costs, as there is no need for an encoder pipeline to be running and static content is served through the CDN 101.

Figure 10:
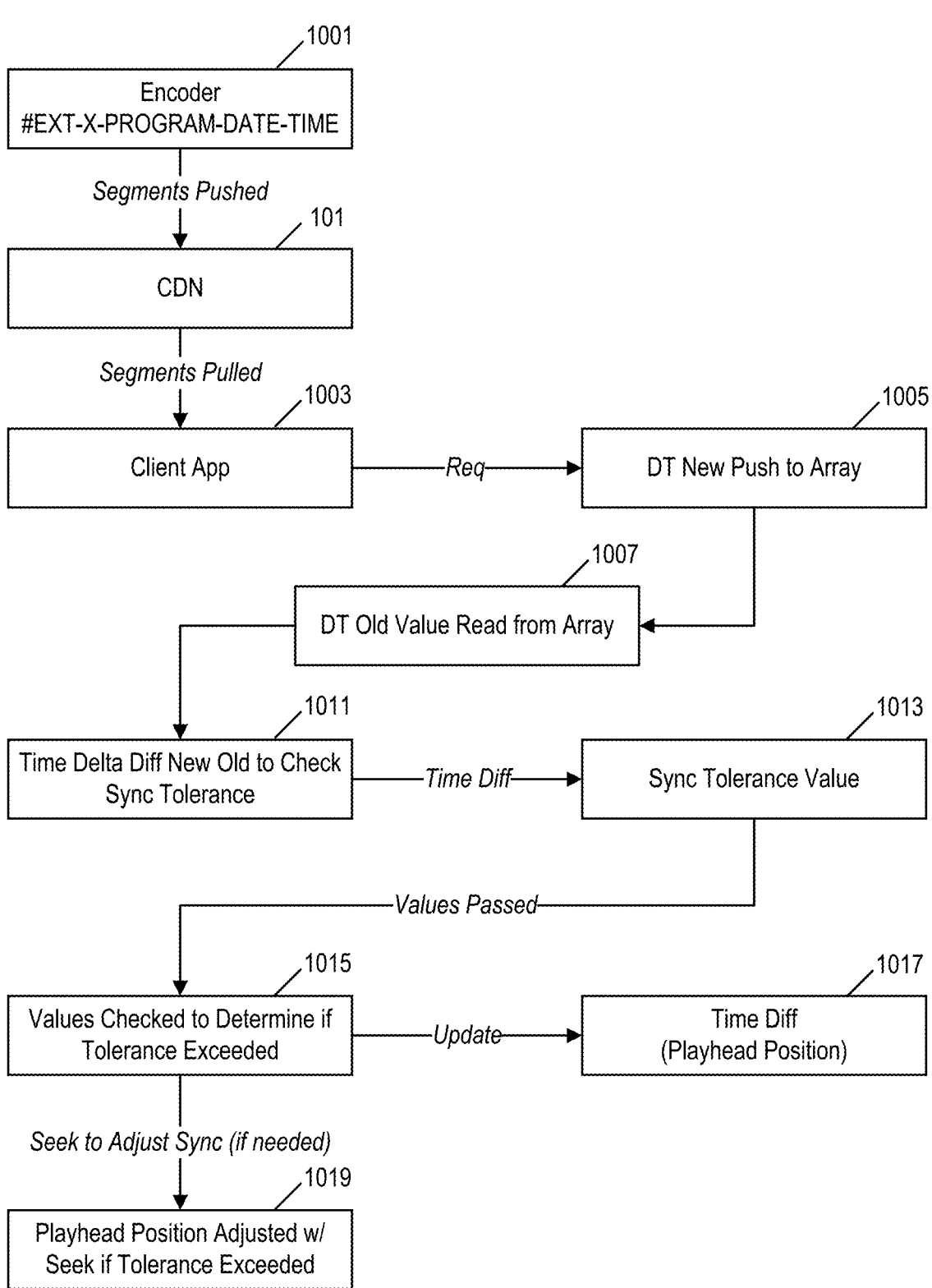
FIG. 10 illustrates further details of the initial synchronization.

FIG. 10 illustrates further details of the initial synchronization. As shown at operation 1001, an encoder encodes segments of one or more video streams 103, adding the #EXT-X-PROGRAM-DATE-TIME information. In an example each segment may be on the order of three seconds long. These segments are pushed to the CDN 101 as shown. It should be noted that there may be multiple streams 103 for a video, such as streams 103 taken from different locations, views, or perspectives of the same event. Those segments may be encoded at the same time and pushed out to the CDN 101 at the same time. Nevertheless, there may be cases where the head of one stream 103 is multiple seconds ahead of or behind that of another stream 103. This may be caused by various factors, such as how the manifest is being read and how quickly the segments are being propagated across the CDN 101.

At operation 1003, the segments are pulled by a user session 105 executed by a client app, such as a browser of a user device wishing to receive the streams 103. The client app also makes a time request to the NTP server and receives a current time back from the NTP server. The client app then creates a delta time between the date-time stamp that the encoder indicated in the #EXT-X-PROGRAM-DATE-TIME information and the current time received from the NTP time server. This time differential is saved to into the date time array 309 at operation 1005.

At operation 1007, the client app reads the old delta time value from the array. As discussed herein, DT old refers to the time differential that is currently being used by the stream 103 as computed above, and DT new is the time differential that is being tested against. The first iteration of the process, it should be noted that DT new and DT old refer to the same value.

At operation 1009, the client app computes a difference between the DT new value and the DT old value to check the synchronization of the stream 103. This different is of course zero for the first iteration. At operation 1011, this difference is compared to a synchronization tolerance value. The synchronization tolerance value should generally be less than the segment length. For example, if the segment length is three seconds, then a synchronization tolerance of one second may be applicable.

At operation 1013, if the difference exceeds the synchronization tolerance value amount, then the playhead position is updated based on the time difference between DT new and the UTC time. At operation 1015, if the difference is within the synchronization tolerance, then the playhead position is updated to continue the streaming of the current segment at the correct time offset. At operation 1017, seek is used to adjust the synchronization, if the difference is outside the synchronization tolerance (if required).

Figure 11:
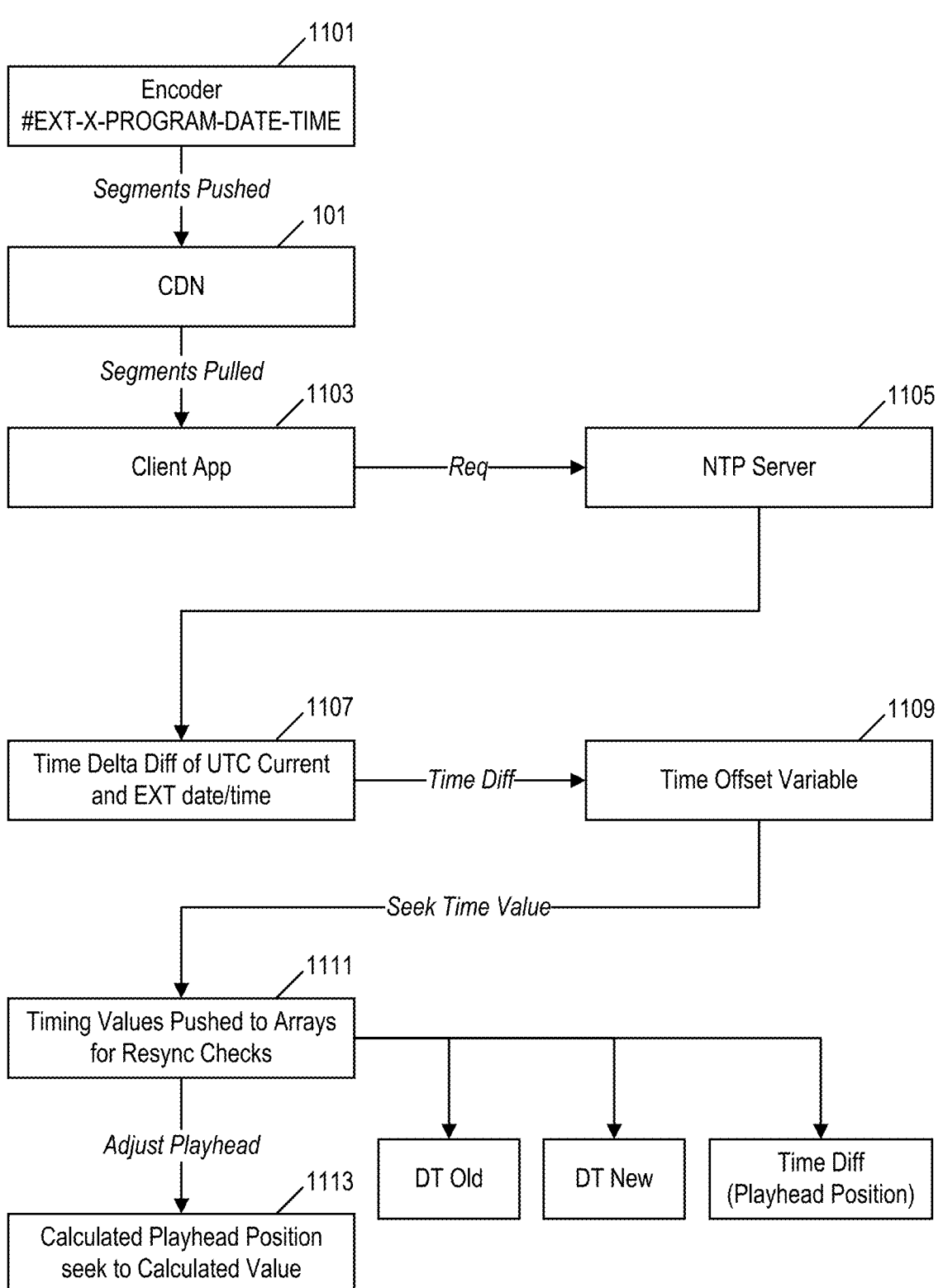
FIG. 11 illustrates further details of subsequent synchronizations.

FIG. 11 illustrates further details of subsequent synchronizations. Similar to operation 1001, at operation 1101, an encoder encodes segments of the video, adding the #EXT-X-PROGRAM-DATE-TIME information. These segments are pushed to the CDN 101 as shown. At operation 1103, similar to operation 1103, the segments are continued to be pulled by the user session 105 of the client app, such as a browser of a user device wishing to steam the content.

At operation 1105, the client app again makes a time request to the NTP server and receives a current time back form the server. At operation 1107, the client app again determines a time delta difference of UTC current time from the NTP server and the #EXT-X-PROGRAM-DATE-TIME to check the synchronization of the stream 103.

At operation 1109, this difference is set to a time offset variable. At operation 1111, the time offset variable may be compared to the sync tolerance value to determine whether the stream 103 has drifted in time offset far enough to require a re-synchronization. For example, if the difference exceeds the synchronization tolerance value amount, then the playhead position is updated based on the time difference between DT new and the UTC time. At operation 1113, then the playhead position is updated to continue the streaming of the current segment at the correct time offset.

Figure 4:
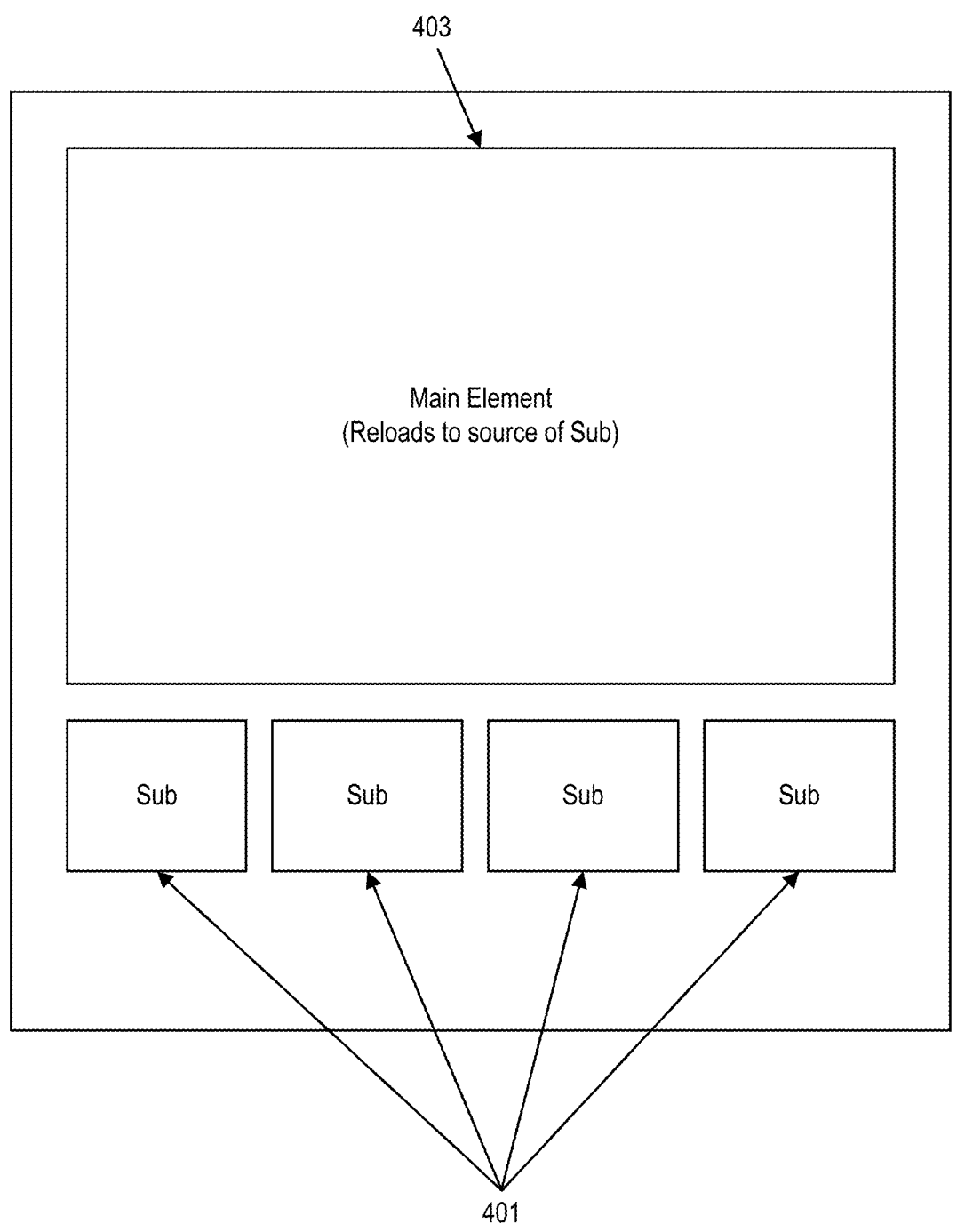
FIG. 4 shows an example user interface of a web player of streamed digital video.

FIG. 4 shows an example user interface showing a plurality of video elements 401 and a larger video element 403 for video selection. This user interface provides several advantages when viewing multiple live streams 103 simultaneously, including an ability to refocus any of the smaller sub video elements 401 to the larger main element 403. This refocus may be accomplished, for example, by tapping or clicking on the smaller video element 401 to bring that video element 401 into the larger video element 403. While not shown, it may also be contemplated that rather than an array of screen on a page, separate screens can also be in sync with the same and different related content.

Figure 5:
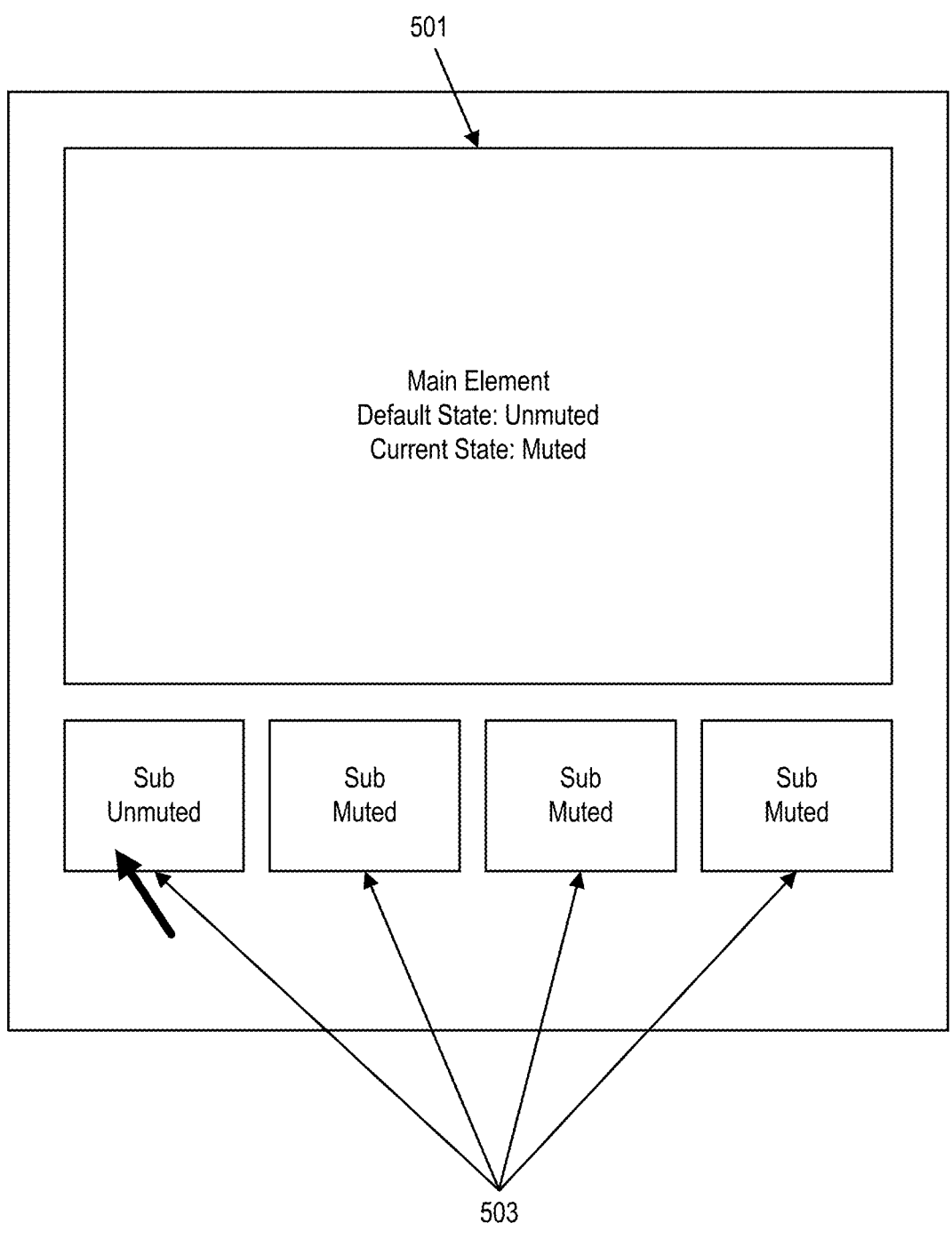
FIG. 5 shows an example user interface of a web player of streamed digital video.

FIG. 5 shows an example user interface showing the plurality of video elements 501 and the larger video element 403 for audio selection. Here, the main video elements 501 is muted, while one of the sub video elements 503 is unmuted. The user interface provides an ability to unmute the smaller video element 503, which may be performed by various selections, such as mouse-hover 501 (desktop) or long-press (mobile). Enabling the sound of one of the smaller video elements 503 may also include muting the main video element 501.

Referring back to FIG. 4, the ability to refocus one of the sub video elements 403 to the main element 401 is novel and non-obvious as, in context of the browser document object model (DOM), the original state of the element to be moved must first be destroyed. When an element is destroyed and reloaded, without the module discussed in detail in FIG. 3, there is no guarantee that the user interface will load the playhead back to the prior position, with the module the pre-destroy time deltas allow the newly created element to quickly seek back to the synchronized playhead offset and the algorithm performs fine adjustment as needed. These mechanisms provide an approach for viewers to effectively watch multiple video streams 103 simultaneously and with less screen real estate as we see with mobile viewing.

Example Embodiments

While there are several ways to implement the HLS synchronization module, some preferred embodiments employ HTML5 MediaElement(s) with an open source HLS player (of which, many options are available) for Chromium based browsers or native HLS player backend for Webkit based browsers. The sync module, e.g., as discussed with respect to FIG. 3, is imported by the front end stack and the three initialization functions 301, 303, 305 are called, specifying the source array 301 and video element array then calling the corresponding sync function for the detected browser core. One of two visual layouts are suggested for the embodiment (e.g., as shown in FIGS. 4-7), but many are possible and left to the discretion of the web designer.

Figure 6:
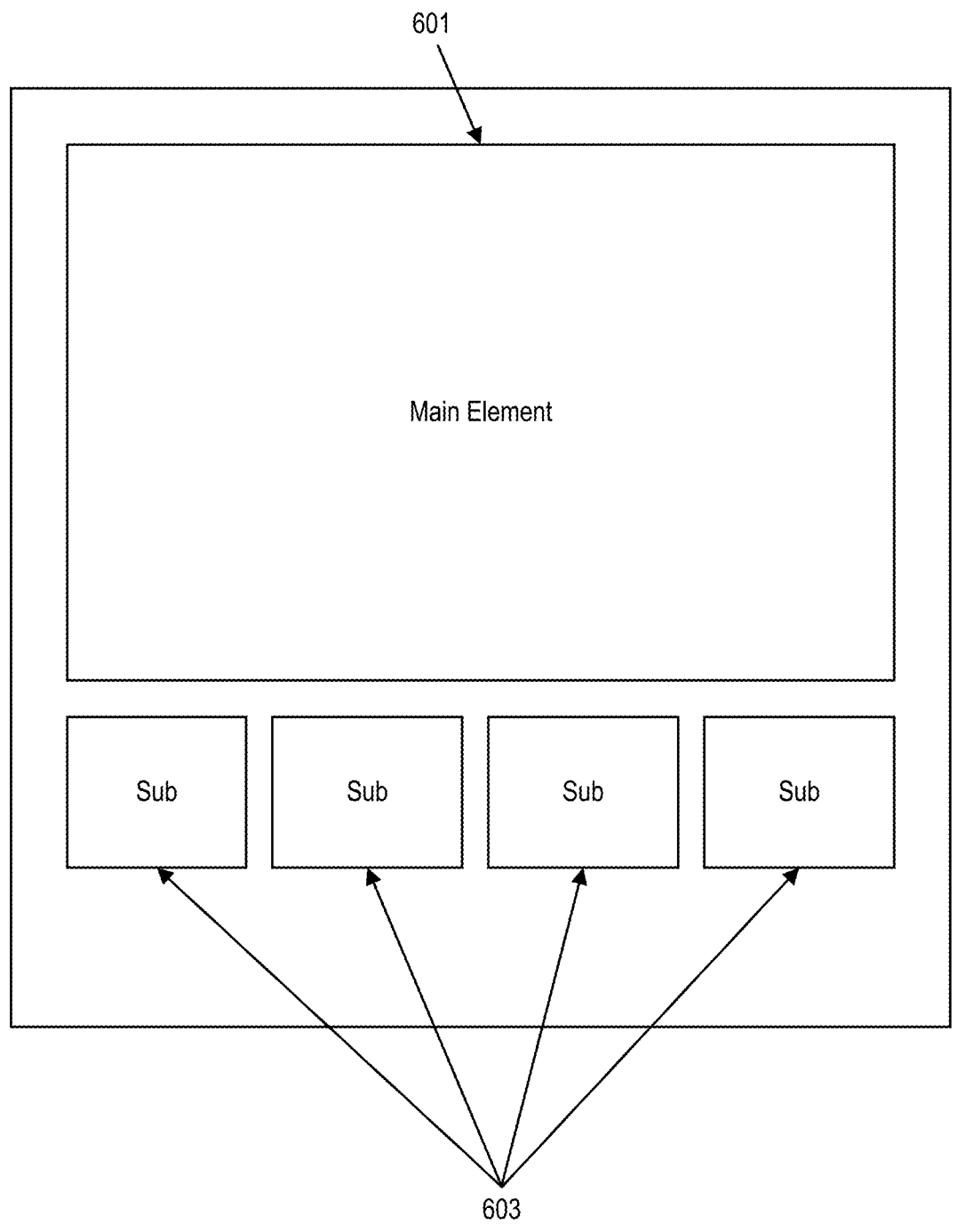
FIG. 6 shows an example user interface of a web player of streamed digital video.

A first suggested embodiment best highlights the features of the module. A larger main video element 601, hosting the main stream 103 or program feed, with smaller sub video elements 603 arranged around the perimeter FIG. 6 is effective for utilizing the entire feature set as described. All elements are initialized to play in-line and start in a muted state. On load, the module functions will bring all of the streams 103 into time synchronization. An on-click event of the main element provides the required user input to enable audio and unmute the main element. Mousing over a sub video element 603, or long press on mobile, will mute the main element and unmute the target sub element, while mousing away mutes the sub element 603 and unmutes the main element 601. An on-click event of a sub element 603 provides one of two recommended actions, the sub element 603 will refocus it to the position of the main element 601 or the sub and main elements 601, 603 will swap position. The first case of the embodiment is appropriate when the design requires all videos to appear as sub elements 603 with a static position, only the main element 601 will be destroyed and recreated on-click. The second case of the embodiment is suitable when the sub elements 603 do not require static positions, on-click the main element 601 and target sub element 603 will both be destroyed, the main element 601 will be recreated in the sub element 603 position, and the sub element 603 will be recreated in the main element position 601.

In either case of the embodiment, when an element is destroyed and recreated the associated time differential variables are moved to the corresponding indices of their arrays. When the element loads into its new position, a new #EXT-X-PROGRAM-DATE-TIME tag 201 is stored to a variable and a time delta is created between the old and new tags. The difference between the two tags is subtracted from the current time array index of the target element, the newly created element "seeks" to the adjusted playhead position, and speed modulation is performed if fine adjustment is required.

Figure 7:
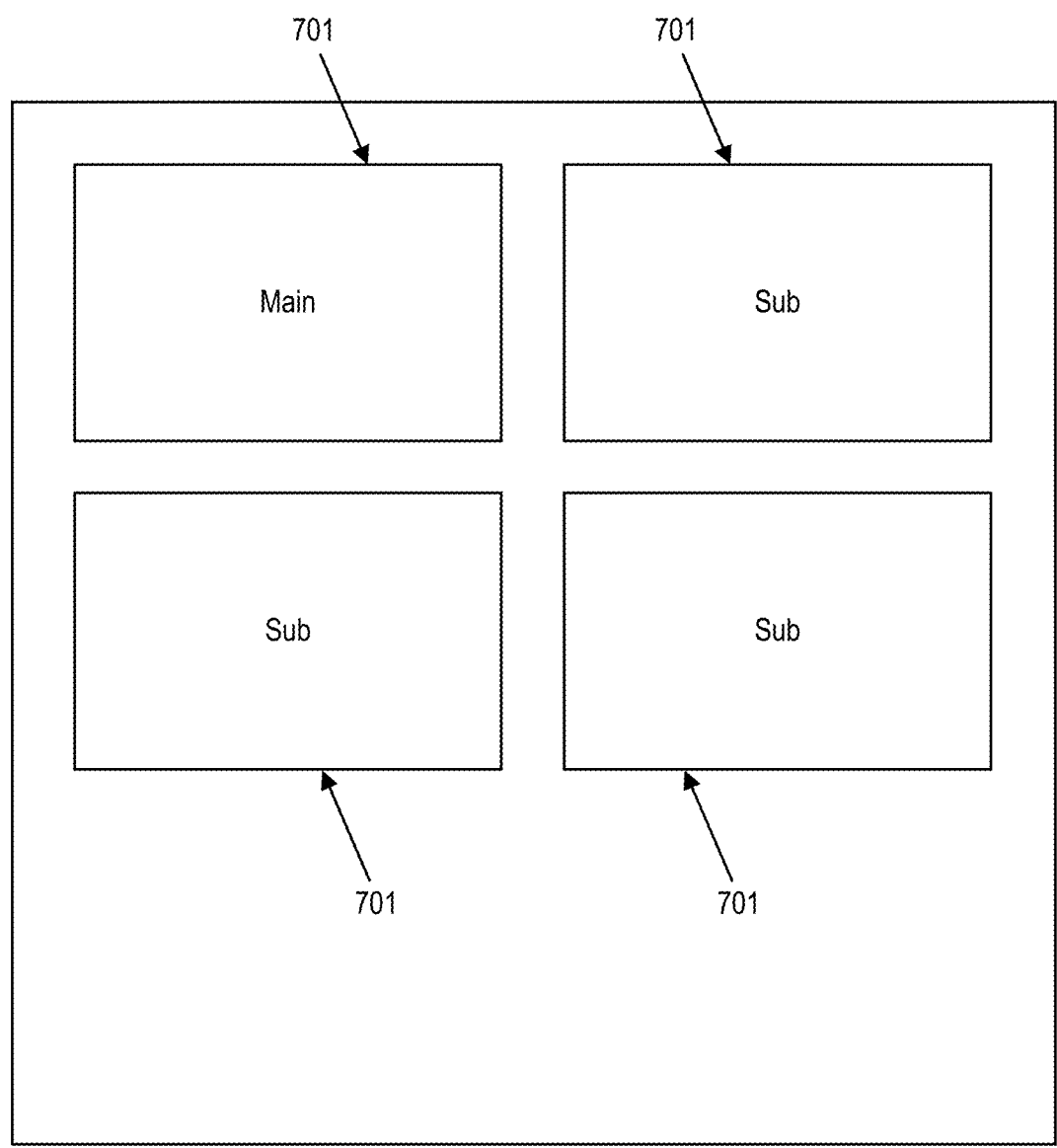
FIG. 7 shows an example user interface of a web player of streamed digital video.

The second suggested embodiment consists of a "multi-box" of equal sized video elements 701, as shown in FIG. 7, where all elements are initialized to play in-line and start in a muted state. Similar to the first embodiment, an on-click event of the video elements 701 will enable audio and unmute the main (typically top left of the multi-box) video element. Mousing over a sub element 701 will perform the same action previously described, but in this case the on-click function is not needed and would be disabled. This type of embodiment is better suited when working with front end frameworks that experience issues destroying and recreating elements, but still leverage the multi-stream synchronization functions.

Objects and Advantages

The presented approaches offers the ability to synchronize multiple live and on-demand HLS video streams 103 without the need for external infrastructure, utilizing only the in-built tag system of HLS protocol and a simple software module. It is capable of automatically resynchronizing in the event of network/bandwidth issues, a behavior we have not observed in any other HLS player 303 function set. It also provides additional "quality of life" functions for dynamically controlling audio states and refocusing hypertext markup language (HTML) MediaElements between positions on a webpage, which would not be possible in a practical way without the aforementioned synchronization functions, to improve the user experience of viewing multiple live and/or on-demand streams 103 simultaneously.

It should be noted that steps are the same for single client multi-stream and multi-client X number of streams 103. The source of truth is always UTC time retrieved from globally-synced NTP servers. As such, all viewers of an event, be they in a shared watch party or watching alone, are +/−1 s from one another in play head position.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), random access memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for synchronizing multiple live Hypertext Transfer Protocol (HTTP) Live Streaming (HLS) streams in hypertext markup language (HTML) MediaElements, the method comprising:
calculating time differentials between video encoder date/time tags and current date/time retrieved from a universal time (UTC) time server;

controlling a playhead position of an HTML MediaElement to maintain a calculated time offset value defined as the current date/time minus a predefined time offset; and
dynamically controlling MediaElement source content and the playhead position while maintaining video synchronization to the predefined time offset.

2. The method of claim 1, wherein the multiple live HLS streams are segmented and UTC date/time stamps of segments are written to a manifest or playlist of the multiple live HLS streams.

3. The method of claim 1, wherein one or more of:
the method is performed using an application programming interface (API) of HTML MediaElements, or
the method is performed using API of HLS video players.

4. The method of claim 3, further comprising using a seek function to adjust the playhead position to a specified position.

5. The method of claim 4, further comprising modulating playhead speed up to adjust the playhead position to the specified position.

6. The method of claim 4, further comprising modulating play speed down to adjust the playhead position to the specified position.

7. The method of claim 1, further comprising checking an actual time offset on an interval and performs actions to adjust the playhead position responsive to the actual time offset indicating that a specified drift is exceeded.

8. The method of claim 1, wherein the HTML MediaElements are destroyed and recreated in a manner that UTC synchronization is restored with the new HTML MediaElement.

9. The method of claim 8, wherein time values calculated prior to destruction of one of the HTML MediaElements are reindexed to restore state of the HTML MediaElement upon recreation of the HTML MediaElement.

10. The method of claim 8, wherein a time delta value is calculated between a prior UTC date/time tag value and a new UTC date/time tag value retrieved upon element recreation.

11. The method of claim 10, wherein the time delta value is used to calculate and seek the playhead position of the source content.

12. The method of claim 1, further comprising synchronizing a plurality of HLS streams received to a client device.

13. The method of claim 1, further comprising synchronizing a plurality of HLS streams across a plurality of client devices, enabling global synchronization of video playback for watch parties composed of a plurality of viewers.

14. The method of claim 13, wherein the viewers are geographically diverse in location.

15. The method of claim 14, wherein the viewers are communicating over voice chat mechanisms.

16. The method of claim 14, wherein the viewers are communicating over video chat mechanisms.

17. The method of claim 14, wherein the viewers are communicating over text chat mechanisms.

18. A system for synchronizing multiple live HLS streams in HTML MediaElements, the multiple live HLS streams being segmented and stamped with UTC date/time stamps in a manifest, the system comprising:
a client hardware device executing a web browser application to perform operations including to:
calculate time differentials between the UTC date/time stamps and current date/time retrieved from a UTC time server;

control a playhead position of an HTML MediaElement to maintain a calculated time offset value defined as the current date/time minus a predefined time offset; and dynamically control MediaElement source content and the playhead position while maintaining video synchronization across the multiple live HLS streams to the predefined time offset.

19. The system of claim 18, wherein the UTC date/time stamps of segments are written to a manifest or playlist of the multiple live HLS streams.

20. The system of claim 18, wherein the client hardware device is further configured to synchronize the multiple live HLS streams using an application programming interface (API) of HTML MediaElements, or using an API of HLS video players.

21. The system of claim 20, wherein the client hardware device is further configured to use a seek function to adjust the playhead position to a specified position.

22. The system of claim 21, wherein the client hardware device is further configured to modulate playhead speed up to adjust the playhead position to the specified position.

23. The system of claim 21, wherein the client hardware device is further configured to modulate play speed down to adjust the playhead position to the specified position.

24. The system of claim 18, wherein the client hardware device is further configured to:

check an actual time offset on an interval and perform actions to adjust the playhead position responsive to the actual time offset indicating that a specified drift is exceeded.

25. The system of claim 18, wherein the client hardware device is further configured to destroy and recreate the HTML MediaElements in a manner that UTC synchronization is restored with the new HTML MediaElement.

26. The system of claim 25, wherein the client hardware device is further configured to reindex time values calculated prior to destruction of one of the HTML MediaElements to restore state of the one of the HTML MediaElements upon recreation of the one of the HTML MediaElements.

27. The system of claim 25, wherein the client hardware device is further configured to calculate a time delta value between a prior UTC date/time tag value and a new UTC date/time tag value retrieved upon element recreation.

28. The system of claim 27, wherein the client hardware device is further configured to use the time delta value to calculate and seek the playhead position of the source content.

29. The system of claim 18, wherein the client hardware device is further configured to synchronize a plurality of HLS streams received to the client hardware device.

30. The system of claim 18, further comprising one or more additional client hardware devices, the one or more additional client hardware devices and the client hardware device comprising a plurality of client devices, wherein the plurality of client devices are configured to synchronize a plurality of HLS streams across the plurality of client devices, enabling global synchronization of video playback for watch parties having a plurality of viewers.

31. The system of claim 30, wherein the viewers are geographically diverse in location.

32. The system of claim 31, wherein the viewers are communicating over voice chat mechanisms.

33. The system of claim 31, wherein the viewers are communicating over video chat mechanisms.

34. The method of claim 31, wherein the viewers are communicating over text chat mechanisms.

35. A non-transitory computer-readable media comprising instruction for synchronizing multiple live HLS streams in HTML MediaElements, the multiple live HLS streams being segmented and stamped with UTC date/time stamps in a manifest that, when executed by a client hardware device executing a web browser application cause the client hardware device to perform operations including to:

calculate time differentials between the UTC date/time stamps and current date/time retrieved from a UTC time server;

control a playhead position of an HTML MediaElement to maintain a calculated time offset value defined as the current date/time minus a predefined time offset; and dynamically control MediaElement source content and the playhead position while maintaining video synchronization across the multiple live HLS streams to the predefined time offset.

* * * * *